United States Patent

[11] 3,583,294

[72] Inventors Robert F. Lense;
 Richard C. Zimmer, both of Rockford, Ill.
[21] Appl. No. 835,034
[22] Filed June 20, 1969
[45] Patented June 8, 1971
[73] Assignee Riegel Paper Corporation
 New York, N.Y.

[54] CONTINUOUS MOTION PACKAGING MACHINE WITH CUT-OFF DEVICE
 13 Claims, 14 Drawing Figs.
[52] U.S. Cl. .................................................... 93/36.01,
 83/318, 83/331, 93/36.9
[51] Int. Cl. .................................................... B31b 11/14,
 B23d 35/04, B26d 1/56
[50] Field of Search .......................................... 93/36.01,
 36.6, 36.9; 83/318, 319, 331

[56] References Cited
 UNITED STATES PATENTS
 2,045,928 6/1936 Rubin ............................. 83/318X
 2,615,377 10/1952 Farrell et al. ................. 93/36.01

Primary Examiner—Travis S. McGehee
Attorney—Wolfe, Hubbard, Leijdig, Voit and Osann ABSTRACT: A continuous motion packaging machine for separating cartons which are advanced one-by-one in upright positions along a first predetermined path at a high speed. The cartons advance through a sealing station where a continuous sealing strip is sealed to the open ends of the cartons linking the latter together. A cutter is used to cut the sealing strip between each carton to separate the cartons. The cutter comprises a plurality of cutting blades movable along a second path into and out of intersecting relation with the first path in timed relation with the advance of the cartons so that successive blades are moved into the first path between successive cartons to cut the sealing strip between the cartons. In one embodiment, the cutter is positioned in the sealing station and is mounted on a sealer for movement along the second path. A pivot rod is journaled on the sealer for oscillatory movement, and the blades, which are positioned parallel to one another in planes which are perpendicular to and extend transversely of the first path, are connected to the pivot rod by links for up and down movement when the rod oscillates. To cut the sealer strip, the pivot rod is oscillated thus moving the blades into the first path and cutting the sealer strip. In another embodiment, the cutter is a rotor with the blades mounted around the periphery of the rotor. The rotor is positioned downstream of the sealing station to turn about an axis spaced from and extending transversely of the first path.

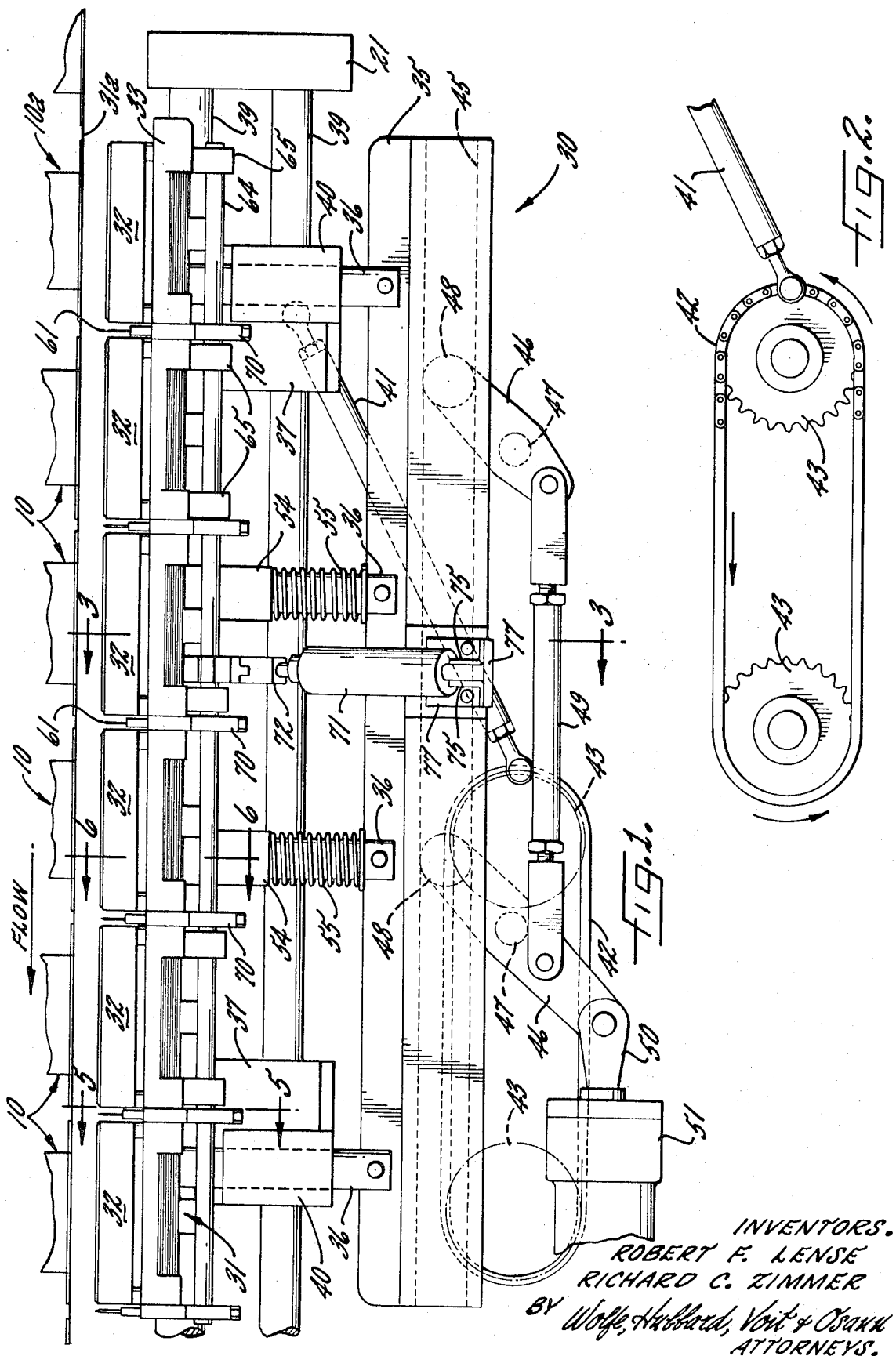

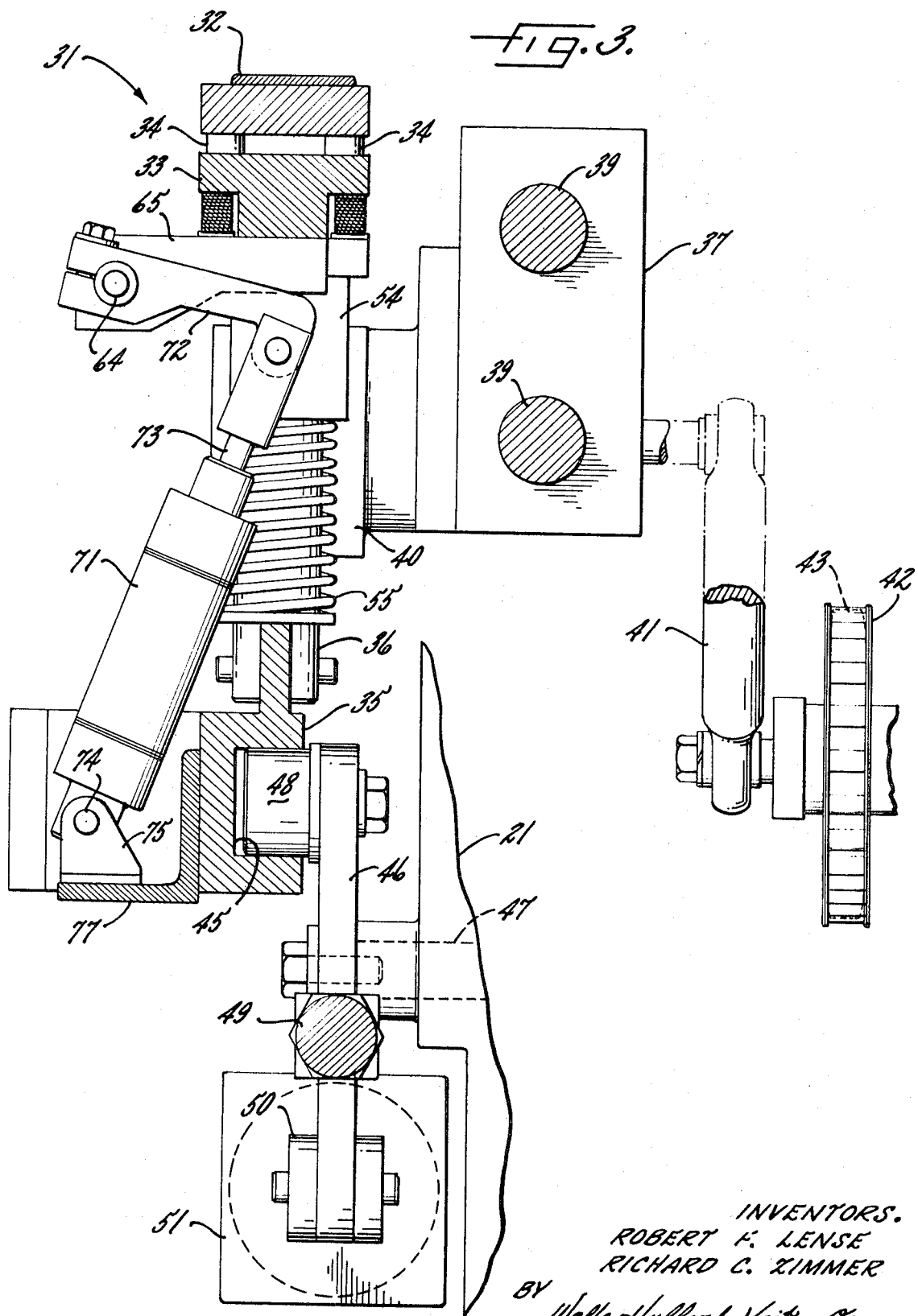

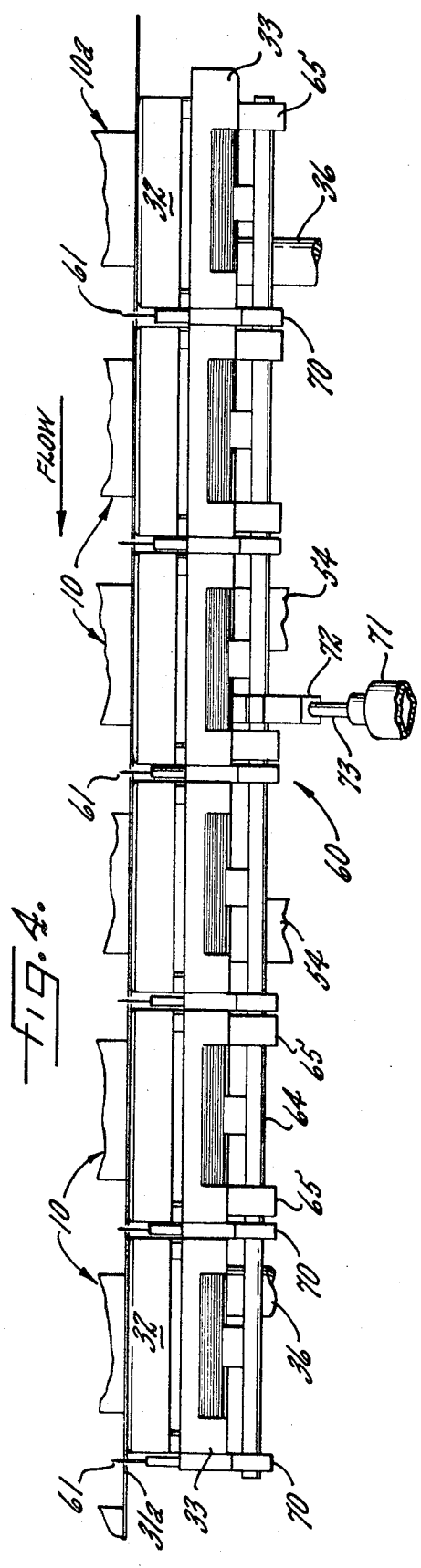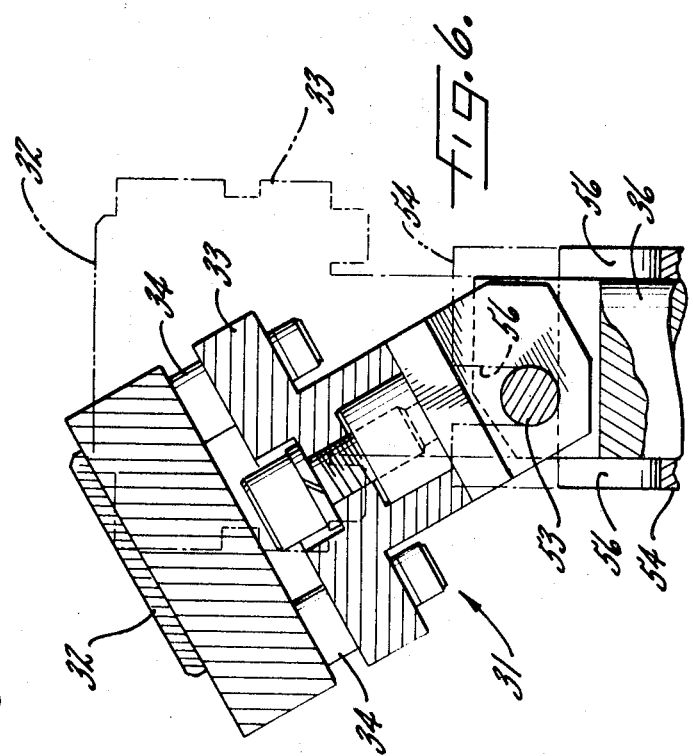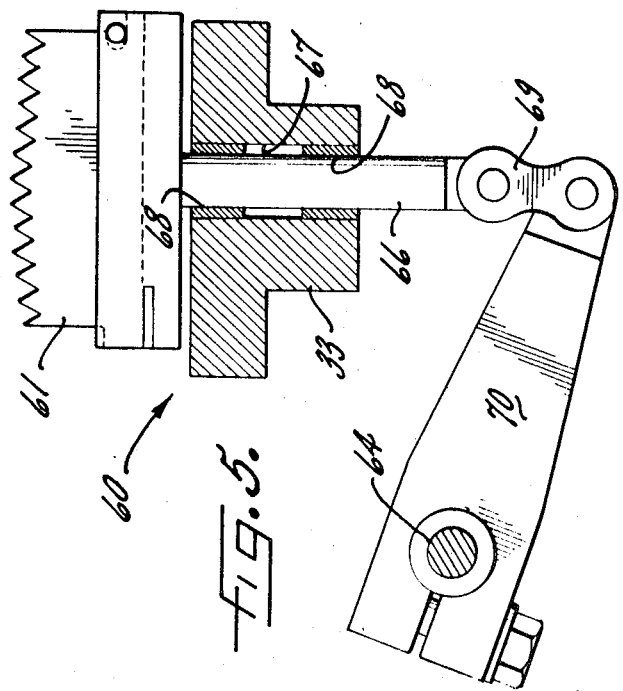

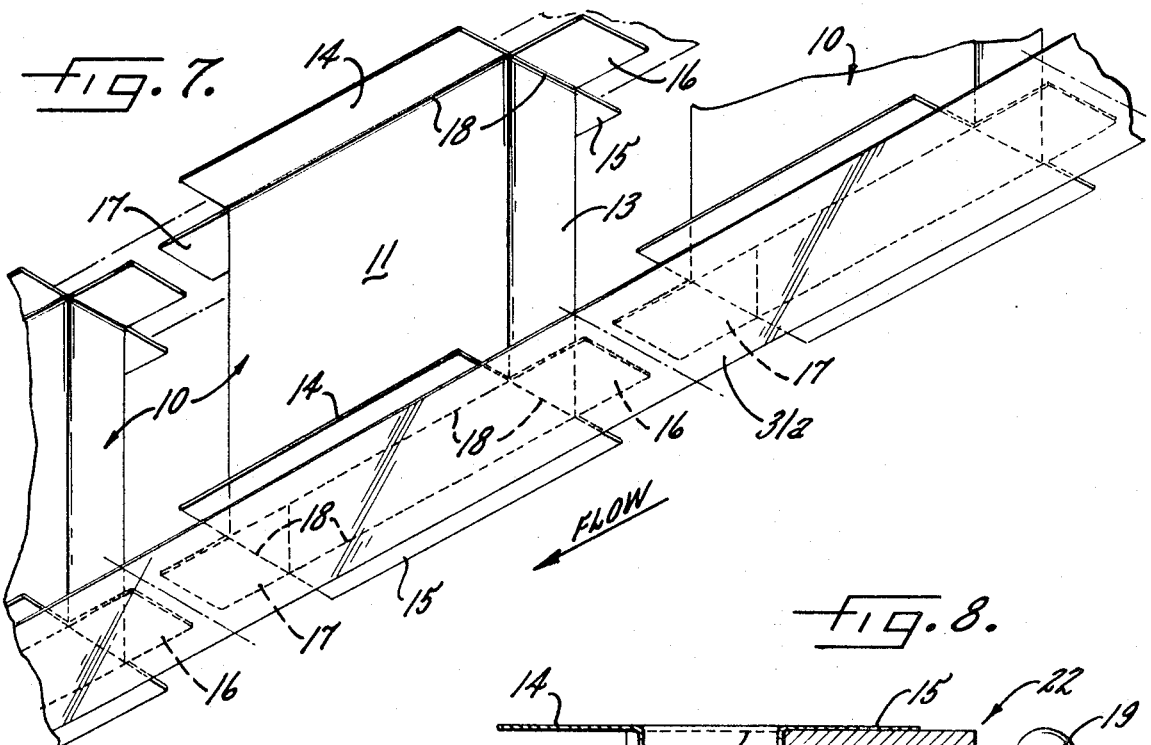
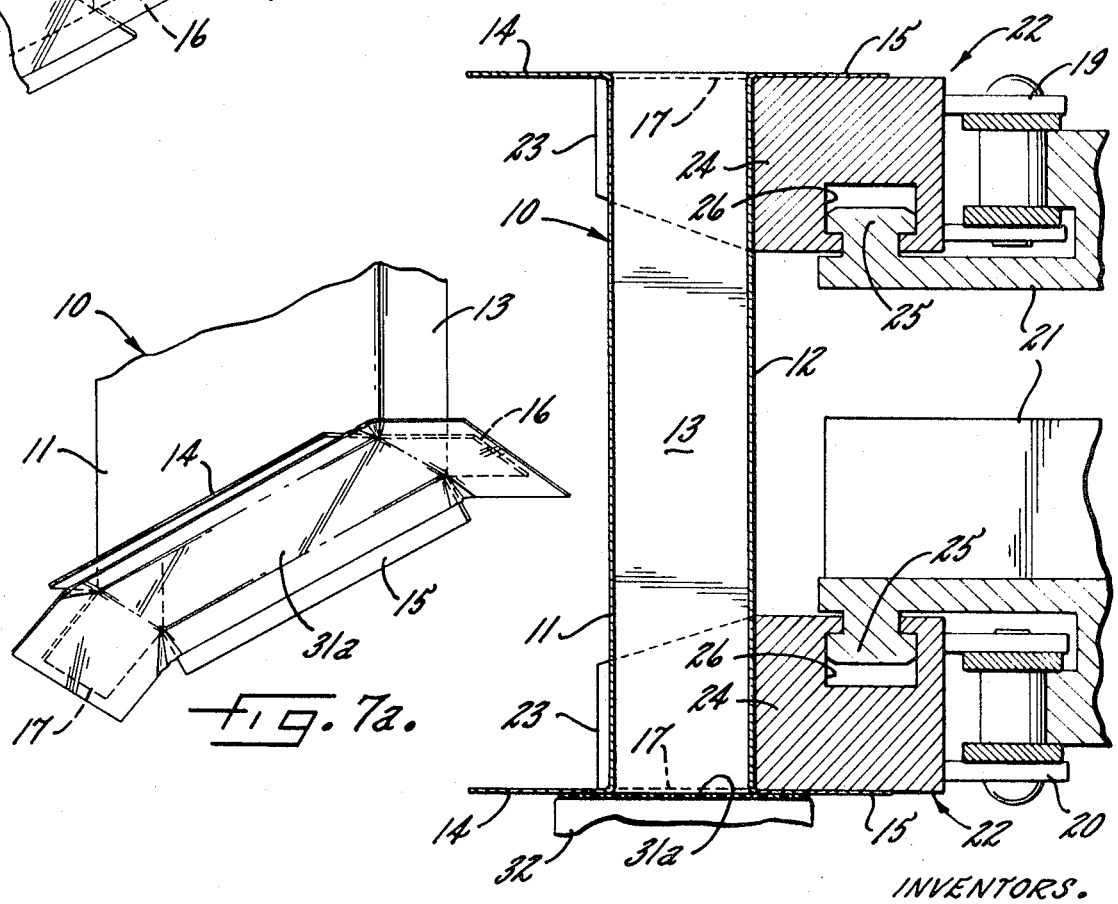

INVENTORS.
ROBERT F. LENSE
RICHARD C. ZIMMER
BY
Wolfe, Hubbard, Voit & Osann
ATTORNEYS.

3,583,294

CONTINUOUS MOTION PACKAGING MACHINE WITH CUT-OFF DEVICE

BACKGROUND OF THE INVENTION

This invention relates to a continuous motion packaging machine for separating cartons with spaced-apart end panels, spaced-apart side panels, and extending flaps hinged to the panels. The cartons are advanced one-by-one in upright positions along a predetermined path at a high rate of speed through a sealing station where a continuous sealing strip is sealed across the open ends of the cartons and to the flaps linking the cartons together and holding the flaps in horizontally extended positions. The sealing strip is sealed to the flaps by the use of heat and pressure applied by a sealer. To separate the cartons, the sealing strip is cut by a cutter positioned in a cutting station and, at stations downstream of the cutting station, the flaps are folded over the ends of the cartons to complete sealing of the cartons.

SUMMARY OF THE INVENTION

It is an object of the present invention to cut the sealing strip between the cartons and to separate the cartons quicker than has been possible heretofore.

It is a related object to accomplish the above by moving a plurality of cutter blades along a second path in timed relation with the advance of the cartons and into and out of intersecting relation with the carton path so that successive blades are moved into the carton path between successive cartons to cut the sealing strip and separate the cartons.

It is another object of the present invention to shorten the length of the machine, and this is accomplished by positioning the sealer and the cutter within the same station.

It is a further object of the present invention to release the flaps from their extended horizontal positions as soon as the sealing of the sealing strip is completed so that the heat from the sealer will not cause the material of the flaps to acquire a memory in a horizontal position.

It is a related object to achieve the foregoing by positioning the cutter within the sealing station and by activating the cutter in timed relation with the actuation of the sealer to separate the cartons as soon as the sealing strip is sealed to the cartons.

It is a further and more detailed object to provide a novel cutter with a plurality of parallel, spaced apart, blades each positioned in a plane perpendicular to and extending transversely of the carton path and adapted to be actuated in unison to cut the sealing strip between several cartons simultaneously.

It is an ancillary object to move the sealer and the cutter along a second path alongside the carton path through the sealing and cutting stations in timed relation with the advance of the cartons to seal the sealing strip to the cartons and cut the sealing strip thus separating the cartons as the cartons are advancing to enable sealing and cutting of the strip as the cartons are advanced continuously.

Other objects and advantages of the invention will become apparent from the following detailed description, taken in conjunction with the accompanying drawings.

BRIEF DESCRIPTION OF THE DRAWINGS

FIG. 1 is a fragmentary elevation of the sealer and showing the cutter mounted on the sealer, parts being broken away for clarity.

FIG. 2 is a view of a portion of the drive for the cutter and sealer with parts broken away for clarity.

FIG. 3 is an enlarged fragmentary cross section taken substantially along the line 3-3 of FIG. 1.

FIG. 4 is a fragmentary view of the upper portion of FIG. 1 but with parts shown in moved positions.

FIG. 5 is an enlarged cross section taken substantially along the line 5-5 of FIG. 1.

FIG. 6 is an enlarged fragmentary cross section taken substantially along the line 6-6 of FIG. 1 and showing the sealing bar of the sealer in a cleaning position with the working position of the sealing bar shown in phantom.

FIG. 7 is a fragmentary perspective view of a number of cartons with the sealing strip sealed across the bottom ends of the cartons and linking the cartons together.

FIG. 7a is a fragmentary perspective view of a carton after the sealing strip has been cut and showing the flaps moved from the horizontal positions.

FIG. 8 is a fragmentary view of one of the cartons held in a carton holder operable to move the carton along the first path.

DETAILED DESCRIPTION OF THE PREFERRED EMBODIMENTS

Figure 9:
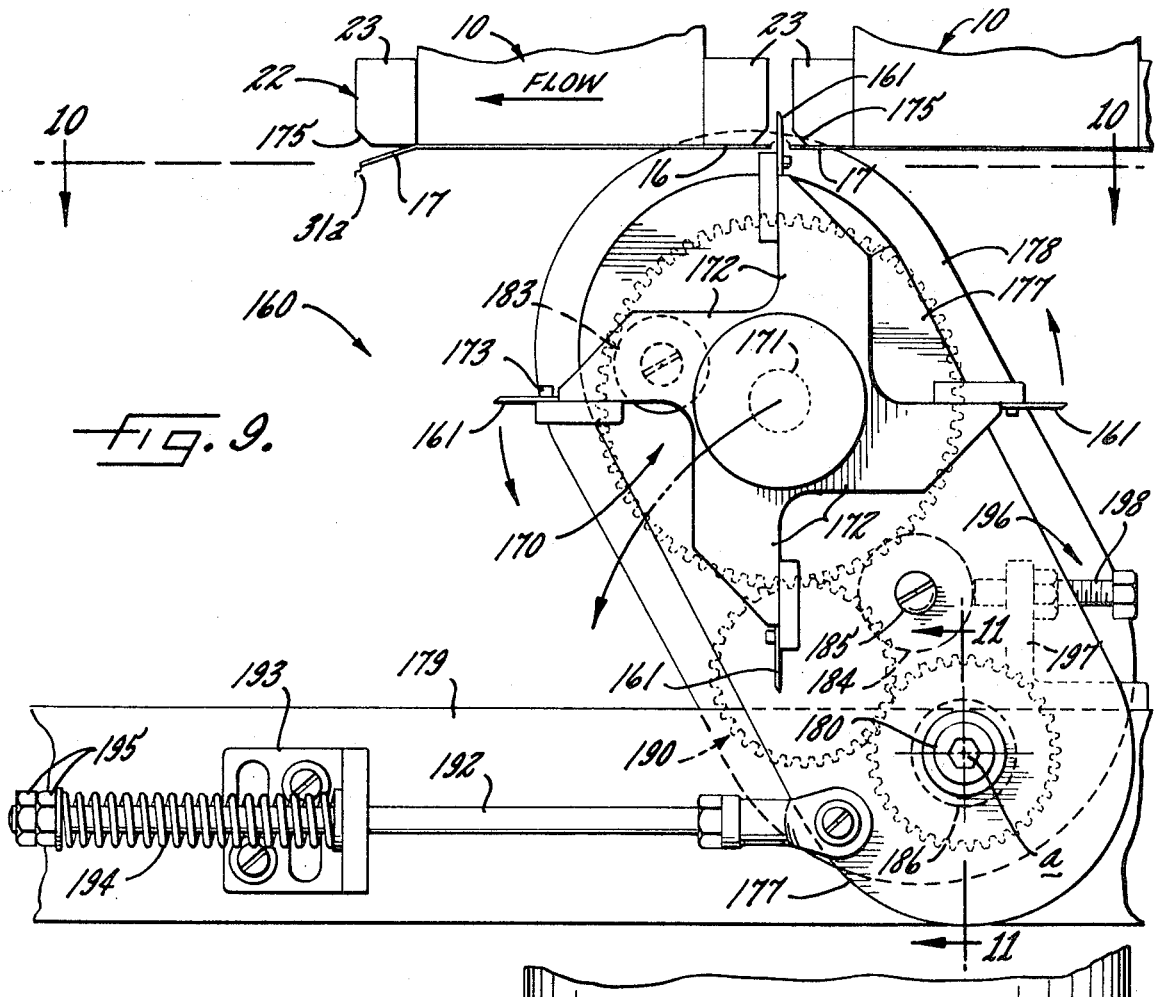
FIG. 9 is a fragmentary view of a second embodiment of the cutter.
Figure 10:
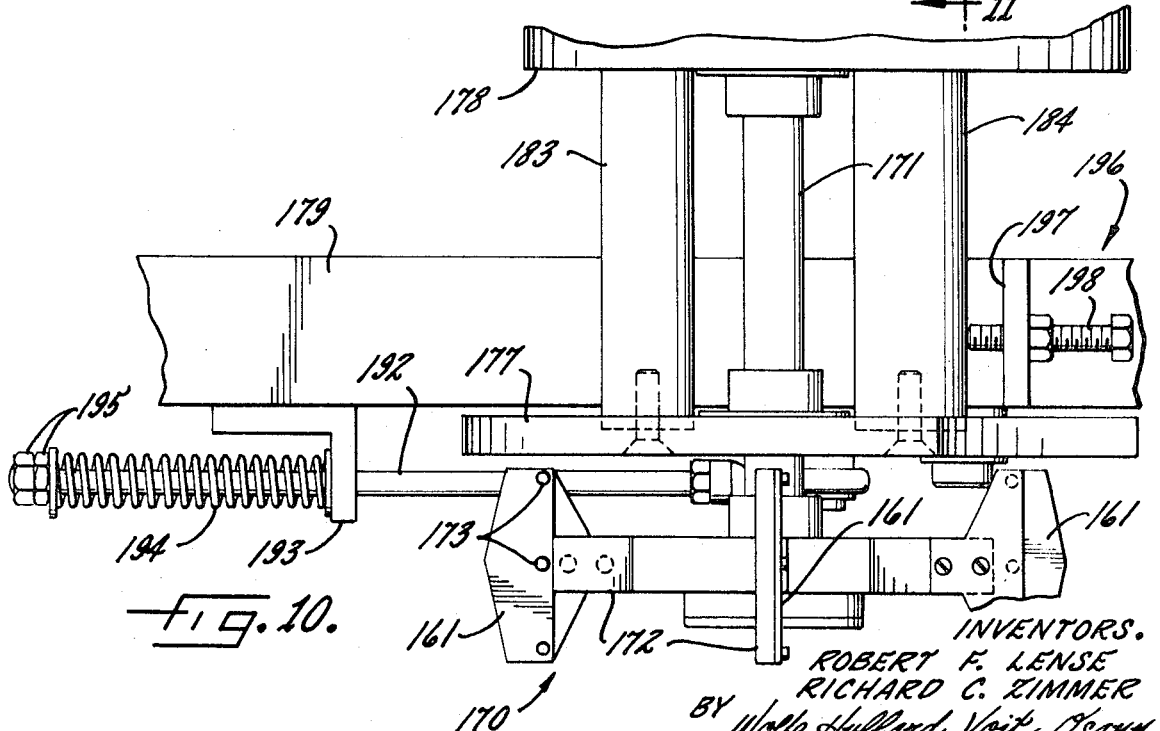
FIG. 10 is a fragmentary cross section taken substantially along the line 10-10 of FIG. 9.
Figure 11:
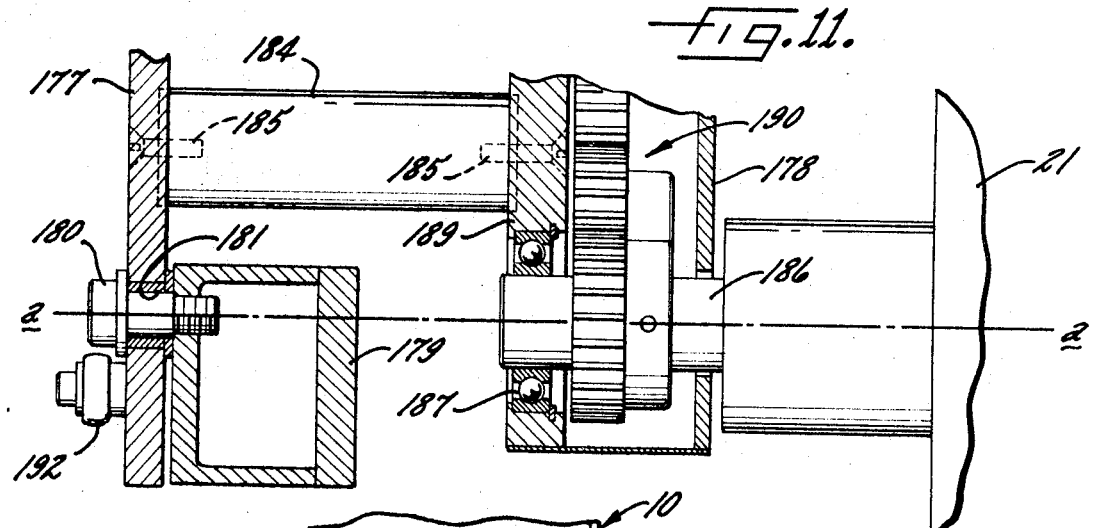
FIG. 11 is an enlarged fragmentary cross section taken substantially along the line 11-11 of FIG. 9.

As shown in the drawings for purposes of illustration, the invention is embodied in a continuous motion packaging machine operable to dispense measured amounts of material such as strawberries into upright cartons 10 (FIGS. 1 and 7) and to seal the cartons as the cartons are advanced continuously at a high rate of speed in a predetermined path. After the cartons have been filled and sealed, the material is frozen within the cartons prior to shipping.

Each of the cartons 10 comprises two opposed, resiliently flexible side panels 11 and 12 (FIG. 8) connected along opposite side margins to two narrow rectangular end panels 13 (one shown in FIG. 7). To close the upper and lower ends of the cartons, side flaps 14 and 15 and end flaps 16 and 17 shown projecting outwardly from the panels in FIG. 7 are folded across the upper and lower ends. The flaps are resiliently hinged at 18 to the panels and normally assume nearly vertical positions unless acted on by the packaging machine. Ultimately, the flaps are folded over the ends of the cartons and sealed to close the cartons.

In this instance, the cartons 10 are supported and advanced along the path on an endless conveyor comprising a pair of parallel horizontal chains 19 and 20 ((FIG. 8) trained around vertically spaced sprocket wheels (not shown) journaled on a frame 21 and suitably driven at a high rate of speed. The side panel 12 and the end panels 13 of each carton fit into and are carried by two vertically spaced holders 22 spaced equally along and connected to the outer sides of the chains. The spacing of the holders along the chains is such that the centers of the cartons are spaced apart a distance greater than the length of a carton with the end flaps 16 and 17 extended horizontally. That is, a small clearance exists between the trailing flap 16 of one carton and the leading flap 17 of the next as the cartons advance along the path. Each holder is formed with outwardly projecting legs 23 engaging the end panels and with a web 24 spanning the legs and supporting the inner side panel 12. The holders are guided along the path by T-shaped guides 25 connected to and extending from the frame 21, and the guides ride in T-shaped slots 26 formed in the webs 24 of the holders.

Prior to filling of the cartons 10, the bottom end flaps 16 and 17 are plowed to outwardly extending horizontal positions (FIG. 7) and, as the cartons pass through a sealing station 30 (FIG. 1), a continuous sealing strip 31a (FIG. 7) is sealed across the open bottom ends of the cartons and to the flaps 14, 15, 16 and 17 to seal the ends of the cartons and, as a result, to link the cartons together. The sealing strip is sealed to the cartons through the use of heat and pressure applied by a sealer 31 (FIG. 1). To enable sealing of the strip as the cartons are advanced continuously, the sealer is mounted on the frame 21 for movement alongside the path of the cartons in timed relation with the advance of the cartons during the sealing of the sealing strip to the cartons.

In this instance, the sealer 31 seals the sealing strip 31a to the ends of six cartons 10 simultaneously. Six sealing shoes 32 (FIGS. 1, 4 and 6) each with a length substantially equal to the distance between horizontally extending end flaps 16 and 17 of each carton are mounted in end-to-end spaced relation along the upper surface of a horizontal mounting bar 33 by vertical pins 34 (FIG. 6) which space the shoes from the bar, and the centers of the shoes are spaced apart a distance equal to the spacing between the centers of the cartons. The mounting bar is spaced from and overlies a support bar 35 (FIGS. 1 and 3), and four horizontally spaced vertical mounting pins 36 connect the mounting bar to the support bar. To cause movement of the sealing shoes along the carton path, the two outer mounting pins 36 are each connected respectively to one of two cars 37 (FIGS. 1 and 3) which are slidably mounted on a pair of rods 39 extending parallel with the carton path through the sealing station 30 and connected at opposite ends to the frame 21. The end mounting pins 36 are slidably mounted in sleeves 40 which are connected rigidly to the respective cars, this type of connection allowing the pins to move vertically with respect to the cars while mounting the pins for movement horizontally with the cars. To move the sealing shoes 32 along the carton path, the cars are pushed and pulled along the rods 39 by a connecting arm 41 (FIG. 1) which is pivotally connected at one end to one of the cars 37 and at its other end to a drive chain 42. The drive chain is trained around and driven by a pair of spaced apart sprocket wheels 43 which are journaled on the frame and suitably driven. As the connecting arm follows the drive chain around the two sprocket wheels, the car 37 is alternately pulled along the rods 39 to the left (FIG. 1) and then pushed back along the rods to the right. This back and forth movement moves the sealing shoes first alongside the carton path in the direction of carton flow and then reversely against the flow of the cartons.

When the sealer 31 moves with the cartons 10, the sealing shoes 32 are brought into contact with the bottoms of the cartons to seal the sealing strip 31a to the cartons and, when the sealer moves against the flow of the cartons, the sealer is lowered out of contact with the cartons. To accomplish this, a longitudinally extending, horizontal guideway or track 45 (FIGS. 1 and 3) is formed in one vertical face of the support bar 35. A pair of parallel, spaced-apart links 46 are pivotally connected intermediate their ends to the frame 21 (FIG. 3) by pins 47 (FIGS. 1 and 3), and rollers 48 journaled on the upper end portions of the links ride in the track 45. Beneath the pins 47, the links are joined by a rod 49 (FIG. 1) which is pivotally connected at opposite ends to the links. The rod 50 of an actuator 51 is connected to the lower end of one of the links, and actuation of the actuator to extend the rod 50 swings the upper ends of the links upwardly and to the left (FIG. 1) forcing the support bar 35 upwardly to push the sealing shoes 32 into pressing engagement with the bottoms of the cartons 10 (FIG. 4), the outer pins 36 sliding upwardly in the sleeve 40 to allow upward movement of the support bar. Activation of the actuator to retract the rod reverses the process and lowers the sealing shoes. The sealing shoes thus are moved along the carton path in timed relation with the advance of the cartons, and the actuator is activated to push the sealing shoes up when the shoes are traveling in the direction of the carton flow.

Because it is necessary to clean the sealing shoes 32 from time to time, the mounting bar 33 is pivotally connected to the mounting pins 36 by longitudinally extending pivot pins 53 (FIG. 6), and these connections allow the mounting bar and the sealing shoes to be swung outwardly to the cleaning position shown in FIG. 6. Mounted slidably on each inside mounting pin is a sleeve 54 FIGS. 1 and 6) which is biased upwardly by a spring 55 telescoped on the pin. Slots 56 (FIG. 6) are formed on opposite sides of each sleeve so that the sleeve can ride up the mounting pins 36 past the pivot pins 53 to lock the mounting bar against swinging. When the sealing shoes are to be cleaned, the sleeves are pushed down against the force of the springs 55 until the tops of the sleeves are below the pivot pins thus freeing the mounting bar for swinging and, to hold the sleeves down, they may be rotated to move the slots 56 out of alignment with the pivot pins so that the tops of the sleeves will rest against the pivot pins when the sleeves are released to the action of the springs.

Once the cartons 10 are linked together by the sealing strip 31a, it becomes necessary to cut the sealing strip between the cartons to separate the cartons. The sealing strip is cut between the trailing end flap 16 of each carton and the leading end flap 17 of the following carton thus allowing the end flaps to swing downwardly toward their original positions by virtue of the memory of the carton material so that these flaps can be folded to closed positions.

In accordance with the present invention, a cutter 60 (FIG. 4) moves a plurality of spaced-apart cutting blades 61 through a cutting station in timed relation with the advance of the cartons 10 and into and out of intersecting relation with the path of the cartons so that successive blades are moved into the path of the cartons to cut the sealing strip 31a and separate the cartons. In the embodiment shown in FIGS. 1 to 5, this is advantageously accomplished by mounting the cutting blades on the sealer 31 for movement in parallel, spaced apart, vertical planes in timed relation with the sealing of the sealing strip to the cartons. With this arrangement, the cartons can be separated more quickly than has been possible previously thus allowing the cartons to be advanced at higher speeds and, with the embodiment of FIGS. 1 to 5, the sealing strip can be cut as the latter is sealed to the cartons releasing the end flaps 16 and 17 to swing downwardly to the positions shown in FIG. 7a before the memory of the carton material is reduced as might occur if the packaging machine were stopped abruptly with the sealing shoes only partially retracted thus allowing the heat from the sealing shoes 32 to radiate upwardly reducing the memory of the material.

With the embodiment of FIGS. 1 to 5, six cutting blades 61 are spaced apart along the carton path and are moved in unison to cut the sealing strip 31a between the six cartons 10 as the cartons are being engaged by the sealer 31, and this occurs while the sealing strip is being sealed to the cartons so that, when the sealing shoes 32 are lowered, the end flaps 16 and 17 are free to swing downwardly without being restricted by the connected sealing strip. To enable cutting during the continuous advance of the cartons, the blades are mounted on the sealer and move along the carton path with the sealer in timed relation with the advance of the cartons. Each blade is mounted for vertical movement and extends laterally of the carton path in the space between the ends of adjacent sealing shoes. This location places each blade below the space between the trailing flap 16 of one carton and the leading flap 17 of the next so that the blade can be moved upwardly to cut the sealing strip without cutting the carton.

To move the blades 61 upwardly and downwardly in unison, each blade is connected by linkage to a rock shaft 64 (FIG. 1) which extends longitudinally along the carton path and which is journaled in arms 65 (FIGS. 1 and 3) rigidly connected to and extending horizontally outwardly from the underside of the mounting bar 33. In this instance, the linkage between each blade and the rock shaft comprises a vertically disposed support rod 66 (FIG. 5) rigidly connected to the bottom of the blade and extending down through an opening 67 in the mounting bar 33, the support rod being slidably journaled in bearings 68 in the opening. A link 69 pivotally connects the lower end of the support rod to one end of a crank arm 70 which is clamped at its opposite end to the rock shaft.

Oscillation of the rock shaft 64 swings the crank arms 70 pushing the blades 61 up and pulling them down. The rock shaft is oscillated in timed relation with the sealing of the sealing strip 31a to the bottoms of the cartons 10. After the sealing shoes 32 have been brought into pressing engagement with the bottoms of the cartons, the shaft is rocked to move the blades up and cut the sealing strip and, before the sealing shoes are lowered out of engagement with the cartons, the shaft is rocked in the opposite direction to lower the blades. A pneumatic actuator 71 (FIG. 3) is connected to the rock shaft to effect the oscillation of the shaft. A crank 72 is rigidly connected at one end to the rock shaft and is pivotally connected at its opposite end to the piston rod 73 of the actuator. The head end of the actuator is pivotally connected by a pin 74 between a pair of L-shaped flanges 75 (FIGS. 1 and 3) welded to an L-shaped mounting bracket 77 which, in turn, is welded to the support bar 35. Extension and retraction of the piston rod cause upward and downward movement of the blades.

The cutting blades 61 are positioned on the downstream side of each sealing shoe 32 to insure that the sealing strip 31a will be pulled through the sealing station 30 by the most upstream carton 10a (FIG. 4) sealed each sealing operation. As shown in FIG. 1, the flow of the cartons is to the left so the most upstream blade is to the left of the most upstream sealing shoe (the one on the right end). The first five cartons in the sealing station are separated thus leaving the sixth carton connected to the roll (not shown) of sealing strip and as the carton 10a advances, while the sealer is on the return stroke, the carton 10a pulls the sealing strip allowing the latter to stretch across the bottoms of the following six cartons advanced to the sealing station. After the sealer begins to seal the sealing strip to the next six cartons, the carton 10a, now out of the sealing station, is separated by the cutter along with the first five cartons of the new group.

It will be observed from the above that the utilization of a plurality of spaced apart vertically movable blades 61 positioned between the sealing shoes 32 is a particularly advantageous arrangement. With this arrangement, the sealing strip 31a can be cut and the cartons 10 separated quickly and easily and, with the cutting station positioned within the sealing station 30, the length of the packaging machine can be shorter than if the cutting station followed the sealing station. Additionally, cutting of the sealing strip as the latter is being sealed to the cartons frees the end flaps 16 and 17 to swing downwardly immediately upon lowering of the sealer 31. In this way, the memory in the material of the end flaps causing the flaps to swing downwardly is not endangered if the machine should be shut down leaving the cartons dwelling over the hot sealing shoes 32.

Another embodiment of the invention is shown in FIGS. 9 to 13 in which a cutter 160 like the cutter 60 moves a plurality of spaced apart blades 161 into and out of intersecting relation with the path of the cartons 10 so that successive blades are moved into the path between successive cartons to cut the sealing strip 31a and separate the cartons. In this embodiment, however, the blades are mounted on a rotor 170 (FIG. 9) positioned downstream of the sealing station 30 and mounted on an axle 171 (FIG. 10) to rotate about an axis extending laterally of and below the path of the cartons. The rotor is formed with four arms 172 (FIG. 9) extending radially outwardly from the axle and spaced angularly 90 degrees apart with the blades 161 connected to the outer ends of the arms by screws 173, and the blades extend laterally of the carton path. The spacing of the axle from the carton path is such that the blades can be moved by the rotor into intersecting relation with the path.

As the cartons 10 advance, the rotor 170 rotates counterclockwise (FIG. 9) in timed relation with the advance of the cartons such that one of the blades 161 rotates up and into the space between adjacent cartons thereby cutting the sealing strip 31a and separating the cartons. That is, the rotor is driven with a peripheral speed equal to the advancement speed of the cartons, and thus successive blades move between successive cartons to cut the sealing strip as the rotor turns. As shown in FIG. 9, the lower outside end edges of the holders 22 are chamfered at 175 to give a greater clearance for the blade to enter into the area between the holders.

Figure 12:
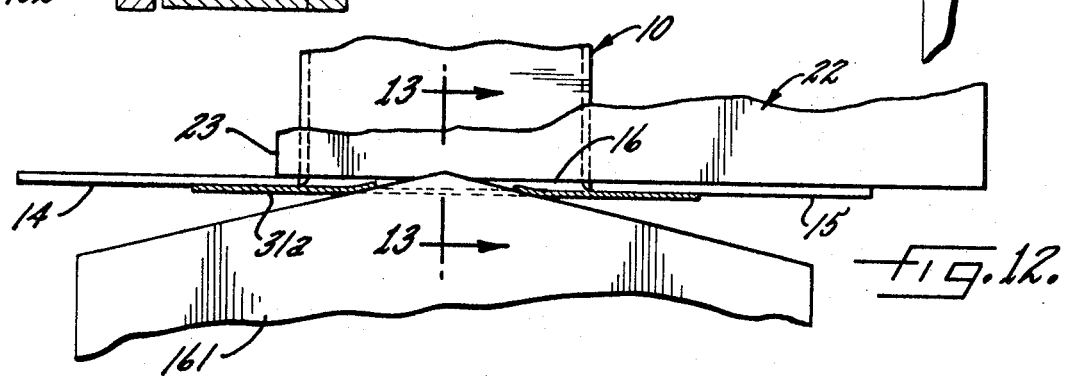
FIG. 12 is an enlarged fragmentary view of one blade of the cutter of FIG. 9 and showing the blade beginning to cut the sealing strip.
Figure 13:
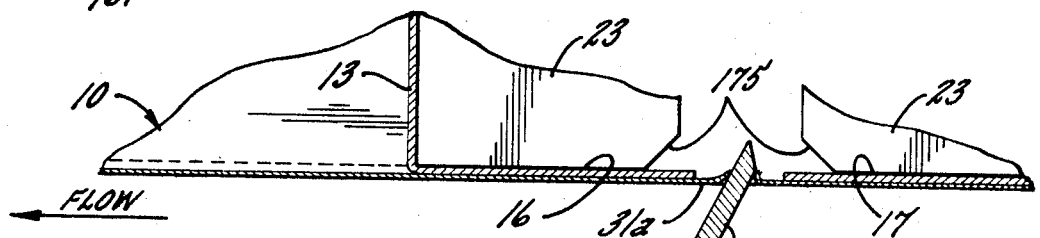
FIG. 13 is a fragmentary cross section taken substantially along the line 13-13 of FIG. 12.
Figure 14:
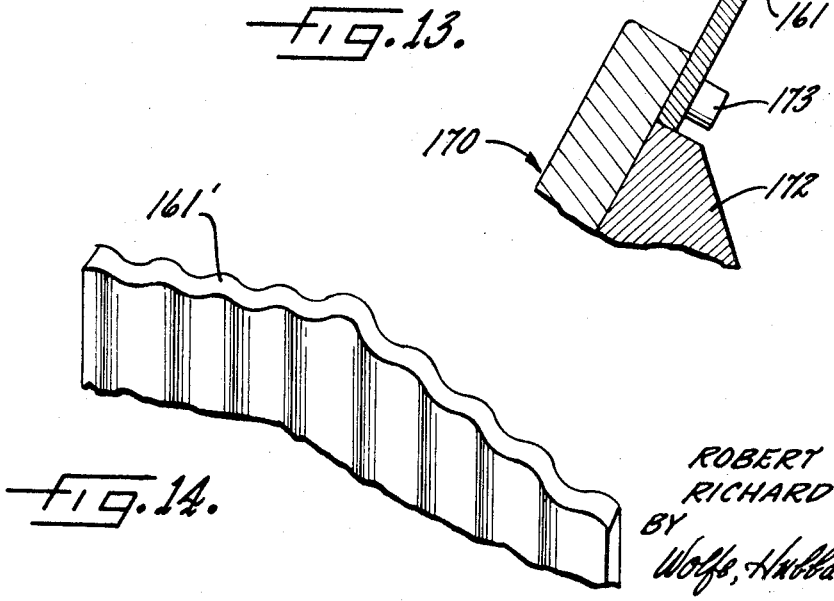
FIG. 14 is an enlarged view of a modification of the cutting blade of FIG. 12.

For ease of cutting and to insure that the sealing strip 31a does not tear as the latter is cut, the cutting edge of the blades 61 and 161 is shaped from a high point at the center to low points at each end. With this arrangement, the blade begins to cut the sealing strip at the center of the strip (FIG. 12) and, as the blade is moved further into the carton path, the sealing strip is cut from the center outwardly to the edges. FIG. 12 shows the blade as being flat and rising to a point in the center, but the blade can be of other shapes such as the serrated blade 161' of FIG. 14 or the toothed blade shown in FIG. 5. It will be observed from these figures that all these blades will cut the sealing strip from the center outwardly as is preferred.

Advantageously, the rotor 170 is mounted on the frame 21 in such a manner that if, the rotor should jam or malfunction, the latter will be moved downwardly to retract the blades 161 from the carton path to protect the cartons 10. The axle 171 of the rotor is journaled in a support plate 177 (FIGS. 9, 10 and 11) and in a gear box 178, and the support plate and gear box are connected together and to the frame 21 to pivot as a unit about an axis $a$ which is parallel to and offset below the axle 171. If one of the blades 161 should be hit by a holder 22, the resulting force would swing the rotor and the unit counterclockwise and down (FIG. 9) about the axis $a$ moving the blade out of intersecting relation with the path of the cartons.

In this instance, the support plate 177 extends vertically and is pivotally connected to one branch 179 of the frame 21 by a cap screw 180 (FIG. 11) journaled in a bearing 181 in the support plate near the bottom of the plate and threaded into the branch 179. To connect the support plate rigidly to the gear box 178 for movement as a unit, a pair of parallel connecting rods 183 and 184 (FIG. 10) extend between and are connected to the support plate and the gear box by screws 185 FIG. 11). The gear box is journaled on a drive shaft 186 (FIG. 11) which rotates about the axis $a$ and extends from and is driven by a suitable motor (not shown) supported on the frame 21. So that the gear box can swing about the axis $a$, the end portion of the drive shaft extends entirely through the gear box and is journaled by ball bearings 187 mounted in an opening in the wall 189 of gear box facing the support plate. Within the gear box, the drive shaft is connected through a train of gears 190 (FIG. 9) to the axle 171 of the rotor 170 to drive the rotor.

A constant bias is applied to the support plate 177 at a point below the axis $a$ tending to swing the support plate, gear box 178, and the rotor 170 as a unit clockwise and upwardly to keep the rotor 170 in position to move the blades 161 into intersecting relation with the carton path. For this purpose, a spring biased rod 192 (FIG. 9) is pivotally connected to the support plate below the axis $a$ and extends to the left (FIG. 9). The rod extends through one leg of L-shaped mounting bracket 193 which is mounted on the branch 179 of the frame 21, and a compression spring 194 telescoped over the rod is compressed between the L-shaped mounting bracket and a pair of nuts 195 screwed onto the other end of the rod 192 resulting in the rod being biased to the left.

In this instance, the normal position of the rotor 170 is established by a stop 196 (FIG. 10) mounted on the branch 179 and acting against the connecting rod 184. The support plate 177, gear box 178 and rotor rotate as a unit clockwise about the axis $a$ under the force of the spring biased rod 192 until the connecting rod 184 contacts the stop holding the rotor in a fixed position. To form the stop 196, one leg of a short piece of angle 197 is welded to the upper surface of the branch with the other leg extending upwardly into the path of the connecting rod 184. A screw 198 extends horizontally through the upstanding leg of the angle to engage the connecting pin and, by turning the screw to move the latter horizontally, the exact location of the rotor can be adjusted.

With the above arrangement, the rotor 170 is held in position by the spring biased rod 192 acting on the support plate 177 to move the blades 161 into intersecting relation with the carton path. If the rotor should jam or malfunction, the rotor along with the support plate and the gear box 178 will rotate as a unit downwardly about the axis $a$ under the force of one of the holders 22 acting against the rotor and against the force of the spring biased rod.

We claim as our invention:

1. In a continuous motion packaging machine for separating cartons which are advanced one-by-one in upright positions along a first predetermined path at a high rate of speed through a sealing station where a continuous sealing strip is sealed across the open ends of the cartons to link the cartons together, the combination of, a frame, a cutting station, a plurality of cutting blades supported on said frame, and means for moving said blades along a second path through said cutting station in timed relation with the advance of the cartons and into and out of intersecting relation with said first path so that successive blades are moved into said first path between successive cartons to cut the sealing strip and separate the cartons.

2. The machine of claim 1 in which said cutting station is positioned downstream of the sealing station.

3. The machine of claim 1 in which said cutting station is positioned within the sealing station.

4. In a continuous motion packaging machine for separating generally vertical cartons having two spaced apart side panels, two spaced-apart end panels, and generally horizontally extending end flaps attached to the end panels, the cartons being advanced one-by-one in equally spaced relation along a predetermined path with one flap of each carton leading and one trailing and being advanced at a high rate of speed through a sealing station where a continuous sealing strip is sealed across the open ends of the cartons and to the flaps to link the cartons together, the combination of, a frame, a plurality of parallel cutting blades mounted on said frame and spaced apart a distance equal to the spacing of the centers of the cartons in the path, said blades being positioned in planes extending perpendicular to and transversely of said path, means for moving said blades along said path in timed relation with the advance of the cartons with said blades registering between successive cartons, and means for moving said blades from positions out of intersecting relation with said path to positions in intersecting relation with said path whereby each blade intersects said path between the trailing flap of one carton and the leading flap of the following carton to cut the sealing strip and separate the cartons while moving with the cartons.

5. The machine of claim 4 in which said blades are positioned in the sealing station to separate the cartons as the sealing strip is sealed to the flaps.

6. The machine of claim 4 in which said blades move in unison.

7. In a continuous motion packaging machine for sealing a sealing strip to the open ends of and for separating generally vertical cartons having two spaced-apart side panels, two spaced-apart end panels, and horizontally extending flaps hinged to the end panels, the cartons being advanced one-by-one in equally spaced relation along a predetermined path through a sealing station with one flap of each carton disposed in leading relation and one flap disposed in trailing relation, the combination of, a sealer disposed within said sealing station, means for moving said sealer along a second predetermined path extending alongside said first path through said sealing station, mechanism for placing and maintaining said sealer in pressing engagement with the ends of the cartons for sealing the sealing strip over the open ends and to the flaps as the cartons are advanced through the sealing station, a cutter disposed within said sealing station for cutting the sealing strip and separating the cartons, said cutter comprising a plurality of parallel cutting blades spaced apart a distance equal to the spacing of the centers of the cartons and positioned in planes extending perpendicular to and laterally of said first path, said cutter being mounted on said sealer for movement with said sealer alongside said first path in timed relation with the advance of the cartons, and means for moving each of said blades into and out of intersecting relation with first path between the trailing flap of one carton and the leading flap of the following carton to cut the sealing strip and separate the cartons as the blades and the cartons are advanced simultaneously.

8. The machine of claim 7 in which said sealer includes a plurality of spaced-apart sealing shoes positioned to engage the bottoms of the cartons when the sealer is in pressing engagement with the cartons, and said blades being mounted on said sealer between said sealing shoes.

9. The machine of claim 7 in which said cutter further includes a rock shaft journaled on said sealer for oscillating movement and extending parallel to said first path in said sealing station, a link connecting each said blade to said shaft so that oscillation of said shaft raises and lowers said blades, and means for oscillating said shaft to raise and lower said blades thereby to alternately cut the sealing strip and retract the blades.

10. The machine of claim 8 in which said oscillating means act in timed relation with said mechanism for placing and maintaining said sealer in pressing engagement with the ends of the cartons so that said blades cut the sealing strip when said sealer is in pressing engagement with the ends of the cartons.

11. The machine of claim 8 in which said blades are mounted on the downstream sides of said sealing shoes so that the sealing strip on the upstream side of the most upstream carton in the sealing station remains uncut as the cartons are separated.

12. In a continuous motion packaging machine for separating generally vertical cartons which are advanced one-by-one in equally spaced relation along a predetermined path at a preselected speed through a sealing station where a continuous sealing strip is sealed across the open ends of the cartons to link the cartons together, the combination of, a frame, a rotor mounted on said frame and journaled to rotate about a first axis extending transversely of and spaced a predetermined distance from said path, cutter blades on the periphery of said rotor and spaced about the periphery of the rotor a peripheral distance equal to the spacing between the centers of the cartons in the path, said blades being rotatable with the rotor into intersecting relation with said path for separating the cartons from one another, and a drive mechanism connected to said rotor to rotate said blades at a peripheral speed substantially equal to said predetermined speed so that the blades intersect the path one at a time between successive cartons to cut the sealing strip between the cartons and separate the latter.

13. The machine of claim 12 further including a support journaled on said frame to swing about a second axis parallel to said first axis, said rotor being journaled on said support to rotate about said first axis, resilient means for holding said support yieldably in a first position in which said axis is spaced said predetermined distance from said path until a predetermined force is exerted against said rotor in the direction of advance of the cartons and causes said support to swing about said second axis to a position in which said first axis is spaced from said path a distance greater than said first distance so that, if the rotor should jam, the force of the cartons advancing along the path will overcome said resilient means and will swing said support about said second axis to move said rotor out of said path.